(12) United States Patent
Zanfei

(10) Patent No.: US 9,669,897 B2
(45) Date of Patent: Jun. 6, 2017

(54) WHEEL FOR PEDAL-ASSISTED BIKES

(71) Applicant: C.R.D. Centro Ricerche Ducati Trento S.r.l., Rovereto (TN) (IT)

(72) Inventor: Adriano Zanfei, Rovereto (IT)

(73) Assignee: C.R.D. Centro Ricerche Ducati Trento S.r.l., Rovereto (TN) (IT)

( * ) Notice: Subject to any disclaimer, the term of this patent is extended or adjusted under 35 U.S.C. 154(b) by 0 days.

(21) Appl. No.: 14/786,174

(22) PCT Filed: Apr. 14, 2014

(86) PCT No.: PCT/IB2014/060714
§ 371 (c)(1),
(2) Date: Oct. 22, 2015

(87) PCT Pub. No.: WO2014/174403
PCT Pub. Date: Oct. 30, 2014

(65) Prior Publication Data
US 2016/0068223 A1    Mar. 10, 2016

(30) Foreign Application Priority Data

Apr. 23, 2013 (IT) .................................. 2013A0111

(51) Int. Cl.
*B62M 6/65* (2010.01)
*B62M 6/50* (2010.01)
(Continued)

(52) U.S. Cl.
CPC ........... *B62M 6/65* (2013.01); *B60B 27/0021* (2013.01); *B60B 27/0068* (2013.01);
(Continued)

(58) Field of Classification Search
CPC ............ B62M 6/00; B62M 6/40; B62M 6/45; B62M 6/50; B62M 6/60; B62M 6/65; B60B 27/0068; B60K 7/0007; B60K 2007/0092
See application file for complete search history.

(56) References Cited

U.S. PATENT DOCUMENTS

2003/0062782 A1* 4/2003 Takano ............... B60L 11/1801
310/75 B
2011/0133542 A1* 6/2011 Ratti ....................... B60B 1/003
301/6.5
(Continued)

FOREIGN PATENT DOCUMENTS

JP    2001-097274    4/2001
JP    2003-160089    6/2003
(Continued)

OTHER PUBLICATIONS

International Search Report Dated Aug. 6, 2014 From the European Patent Office Re. Application No. PCT/IB2014/060714.

*Primary Examiner* — Brian Swenson

(57) ABSTRACT

The wheel (1) for pedal-assisted bikes comprises:
a fixed structure (2) having attachment means for the attachment to the frame (T) of a bike (B) with a driving pedal crank (P);
a circle element (10, 11, 12) mounted on the fixed structure (2) in a revolving way around a main rotation axis (A);
a propulsion disk (13) mounted on the fixed structure (2) in a revolving way and drivable in rotation by the driving pedal crank (P);
motion transmission means (15, 16) for the transmission of the rotational motion from the propulsion disk (13) to the circle element (10, 11, 12), which comprise at least a first detection device (16) suitable for detecting the driving torque transmitted to the circle element (10, 11, 12) from the propulsion disk (13);
an electric motor (54, 55) associated with the fixed structure (2) and suitable for cooperating with the propulsion disk (13) to motorize the circle element (10, 11, 12); and
a processing and control unit (57, 58) operatively connected to the first detection device (16) and to the (Continued)

electric motor (54, 55) and suitable for controlling the activation of the electric motor (54, 55) according to the driving torque detected by the first detection device (16);

wherein the first detection device (16) comprises:
a measuring element (61, 62) which is subject to a stress condition due to the effect of the driving torque transmitted to the circle element (10, 11, 12) by the propulsion disk (13); and
at least a measuring sensor (63) which is arranged in correspondence to the measuring element (61, 62) and which is suitable for detecting the stress condition of the measuring element (61, 62) and for producing a corresponding electronic signal which can be processed by the processing and control unit (57, 58).

19 Claims, 6 Drawing Sheets

(51) Int. Cl.
*B60B 27/00* (2006.01)
*B60B 27/02* (2006.01)
*B60B 27/04* (2006.01)
*B60K 7/00* (2006.01)

(52) U.S. Cl.
CPC ............ *B60B 27/023* (2013.01); *B60B 27/04* (2013.01); *B60K 7/0007* (2013.01); *B62M 6/50* (2013.01); *B60K 2007/0092* (2013.01); *B60Y 2200/13* (2013.01)

(56) References Cited

U.S. PATENT DOCUMENTS

| | | | |
|---|---|---|---|
| 2012/0161495 A1* | 6/2012 | Ito | B62M 6/65 301/6.5 |
| 2013/0049549 A1* | 2/2013 | Folmli | B62M 6/65 310/67 A |
| 2013/0068549 A1* | 3/2013 | Laprade | B62M 6/70 180/206.1 |
| 2014/0035347 A1* | 2/2014 | Zanfei | B62M 6/50 301/6.5 |
| 2016/0014252 A1* | 1/2016 | Biderman | B60L 15/20 455/420 |

FOREIGN PATENT DOCUMENTS

| | | |
|---|---|---|
| WO | WO 2012/123801 | 9/2012 |
| WO | WO 2014/174403 | 10/2014 |

* cited by examiner

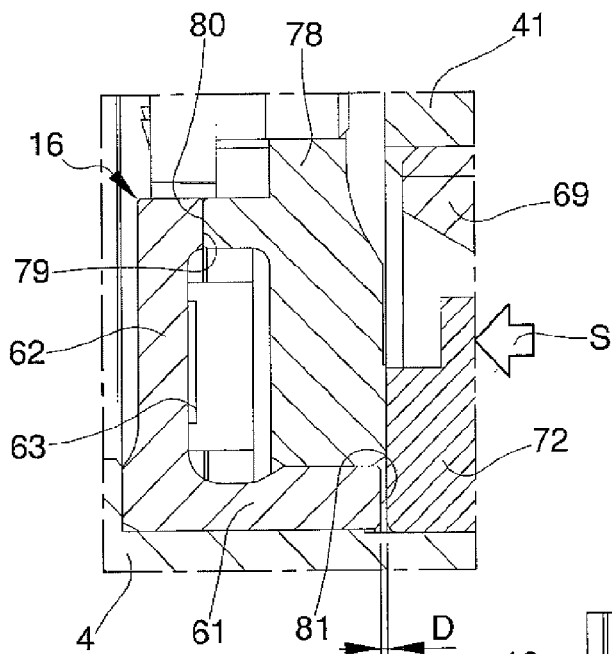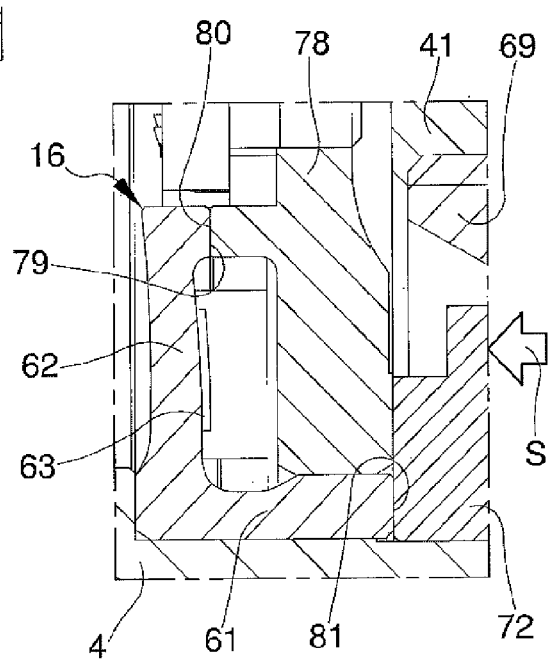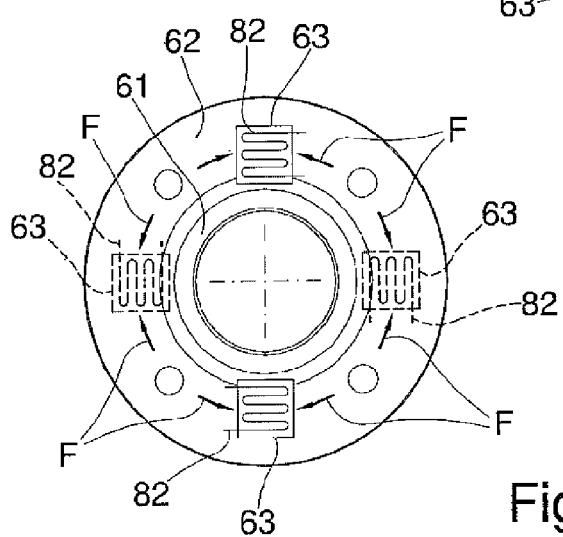

WHEEL FOR PEDAL-ASSISTED BIKES

RELATED APPLICATIONS

This application is a National Phase of PCT Patent Application No. PCT/IB2014/060714 having International filing date of Apr. 14, 2014, which claims the benefit of priority of Italian Patent Application No. MO2013A000111 filed on Apr. 23, 2013. The contents of the above applications are all incorporated by reference as if fully set forth herein in their entirety.

TECHNICAL FIELD

The present invention relates to a wheel for pedal-assisted bikes.

BACKGROUND ART

The pedal-assisted bikes are bikes equipped with an auxiliary electric motor having the following characteristics:
   maximum continuous rated power of the electric motor: 0.25 kW;
   motor power supply is gradually reduced and then interrupted when reaching 25 km/h;
   motor power supply interrupted before 25 km/h if the cyclist stops pedaling.

The electric motor is controlled by means of a processing and control unit that manages the power delivery thereof according to the user's pedaling, balancing the insertion of the propulsion in a progressive manner starting from the very beginning of pedaling, so as to make this fluid and regular.

For this purpose, the pedal-assisted bikes are equipped with a torque sensor arranged in correspondence of the pedals or with a speed sensor located in the pedal crank, or both.

In traditional pedal-assisted bikes the electric motor is housed directly in the motorized wheel hub and is powered by a battery pack which, on the contrary, is mounted on the bike frame.

Taking into account the need to equip the bike with all the above components designed for the performance of various functions, the traditional pedal-assisted systems are usually conceived, since their design phase, to be installed on a specific model of bike.

Only rarely, in fact, it is possible to develop kits able to adapt to several models of bike taking into account the considerable diversity among the bikes on the market, in particular their frames which, of course, have so different shapes and sizes to prevent a practical and comprehensive standardization of the pedal-assisted systems.

Furthermore it should be emphasized that the application of a kit for pedal-assisted bikes in a post-sales stage, even if possible, usually needs to perform inconvenient and impractical operations for adjusting and fixing the various components to the frame, which most of the times can not be accomplished by the end user and require the intervention of an expert technician.

To overcome at least in part the above mentioned drawbacks it is known to integrate into the motorized wheel not only the electric drive motor but also the battery pack, the torque sensor and the gear set.

An example of a wheel with these characteristics is illustrated in the patent document WO 2012/123802.

In this wheel the torque sensor consists of a first plate and a second plate revolving around the rotation axis of the wheel.

The second plate, besides revolving around the rotation axis of the wheel, is also axially sliding in the direction of moving away and close with respect to the first plate in contrast to a spring.

The first plate receives the rotational motion produced during pedaling and transmits it to the second plate through a series of rollers that engage the same number of grip ramps on the second plate.

The rotational motion is transmitted from the first plate to the second plate when the rollers and the relative grip ramps reach a specific relative position that allows to transfer to the wheel the torque required by the load conditions during pedaling.

In fact, under low load conditions (e.g. pedaling on flat ground), the rollers are able to transfer motion and drag in rotation the grip ramps and the second plate without any particular difficulties.

Under higher load conditions (e.g. pedaling uphill), on the contrary, the first plate is not able to immediately grip the second plate.

The first plate, therefore, turns idle with respect to the second plate by a certain angle of rotation, which determines the engagement of the grip ramps by the rollers and the sliding of the second plate in contrast to the spring.

This sliding is interrupted at the time when the rollers are able to transmit to the grip ramps a sufficient torque to drag them in rotation and, with them, also the second plate so as to allow the rolling of the wheel.

Similarly, it should be underlined that during pedaling, the user applies a thrust to the pedal crank which has an uneven pattern, characterized by the alternation of continuous maximum and minimum values.

In correspondence of the thrust maximum values, an excessive torque reaches the first plate compared to that required to drag the second plate, and this determines the rise of the rollers on the grip ramps.

In correspondence of the thrust minimum values, on the other hand, the torque reaching the first plate is less and the rollers engage the grip ramps in a different position.

Depending on the transmitted torque, therefore, the rollers take a different position on the grip ramps, resulting in a corresponding distancing of the second plate with respect to the first plate that can be measured by a distance sensor.

The wheel shown in WO 2012/123802, however, is susceptible of upgrading aimed at improving the user's driving comfort and the system's efficiency.

During the thrust phase of pedaling, in fact, the presence of grip ramps delays the transmission of torque from the pedal crank to the wheel.

During the resting phase of pedaling, on the other hand, the return of the spring to the initial position determines a slight reaction force that is discharged on the pedals.

Under both conditions, this behavior of the wheel is felt by the user as annoying and as an obstacle to pedaling.

DESCRIPTION OF THE INVENTION

The main aim of the present invention is to provide a wheel for pedal-assisted bikes that may be mounted on any traditional model of already existing bike providing it in a practical, easy and functional way with the functions of pedal-assisted bikes and which, at the same time, has a better driving comfort and is more efficient.

Another object of the present invention is to provide a wheel for pedal-assisted bikes which may overcome the above mentioned drawbacks of the prior art in the ambit of a simple, rational, easy and effective to use as well as low cost solution.

The aims described above are achieved by the present wheel for pedal-assisted bikes according to claim 1.

BRIEF DESCRIPTION OF THE DRAWINGS

Other characteristics and advantages of the present invention will become apparent from the description of a preferred, but not exclusive, embodiment of a wheel for pedal-assisted bikes, illustrated by way of an indicative, but not limitative, example in the accompanying drawings in which:

FIGS. 7 and 8 illustrate, in a series of axial cross-section views, the operation of the first detection device of the wheel according to the invention;

FIG. 9 is a front view of a detail of the first detection device of the wheel according to the invention.

EMBODIMENTS OF THE INVENTION

With particular reference to the figures, globally indicated by 1 is a wheel for pedal-assisted bikes.

The wheel 1 is arranged to be mounted on any type of bike B having a frame T and a driving pedal crank P.

Figure 1:
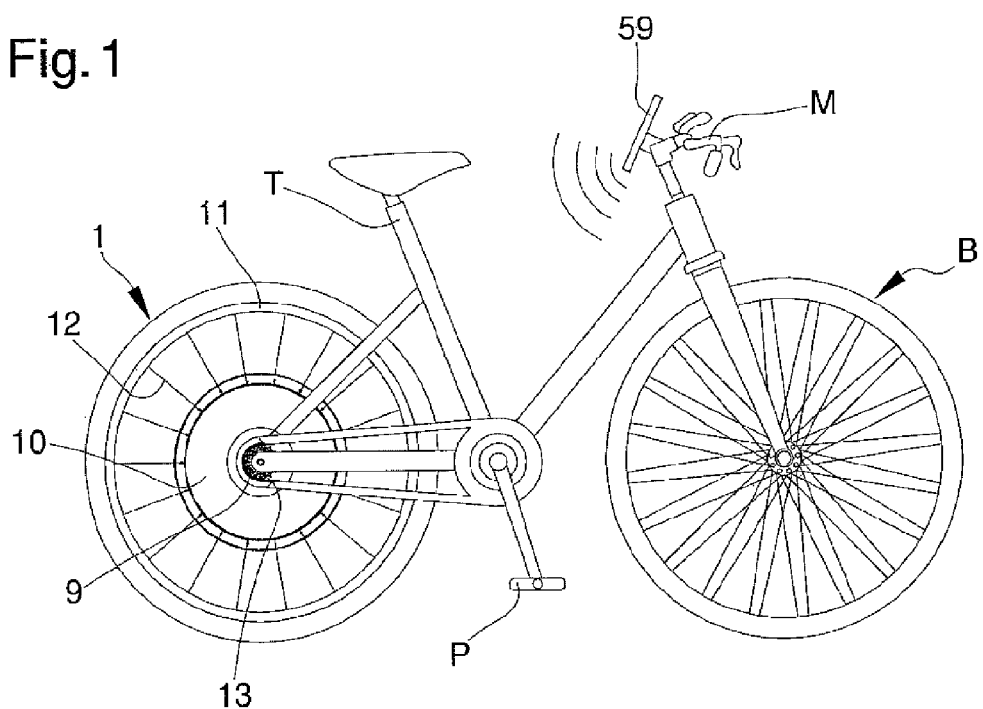
FIG. 1 is a lateral view of a bike that mounts the wheel according to the invention.
Figure 2:
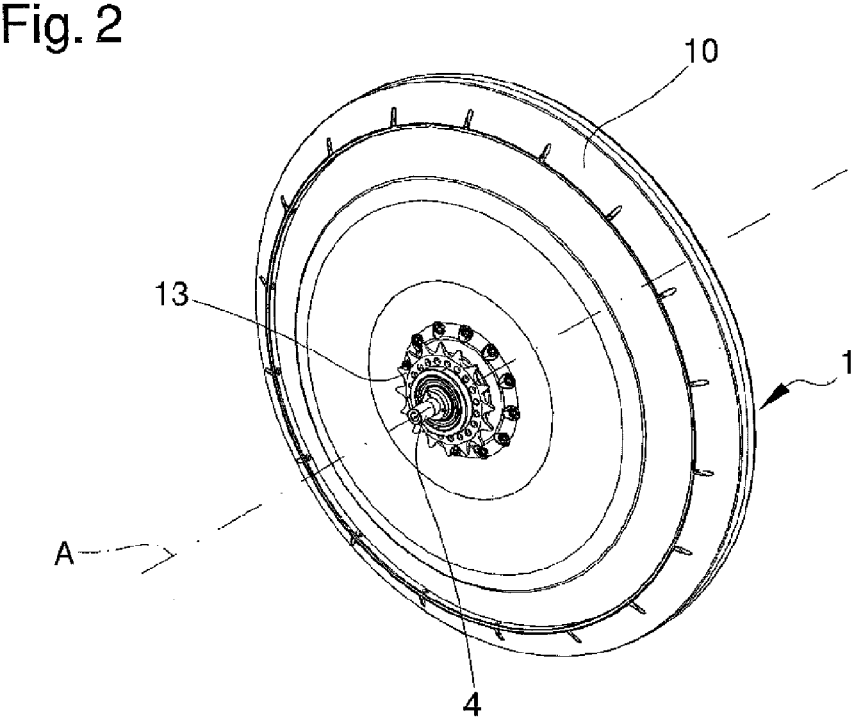
FIG. 2 is an axonometric view of a portion of the wheel according to the invention.
Figure 3:
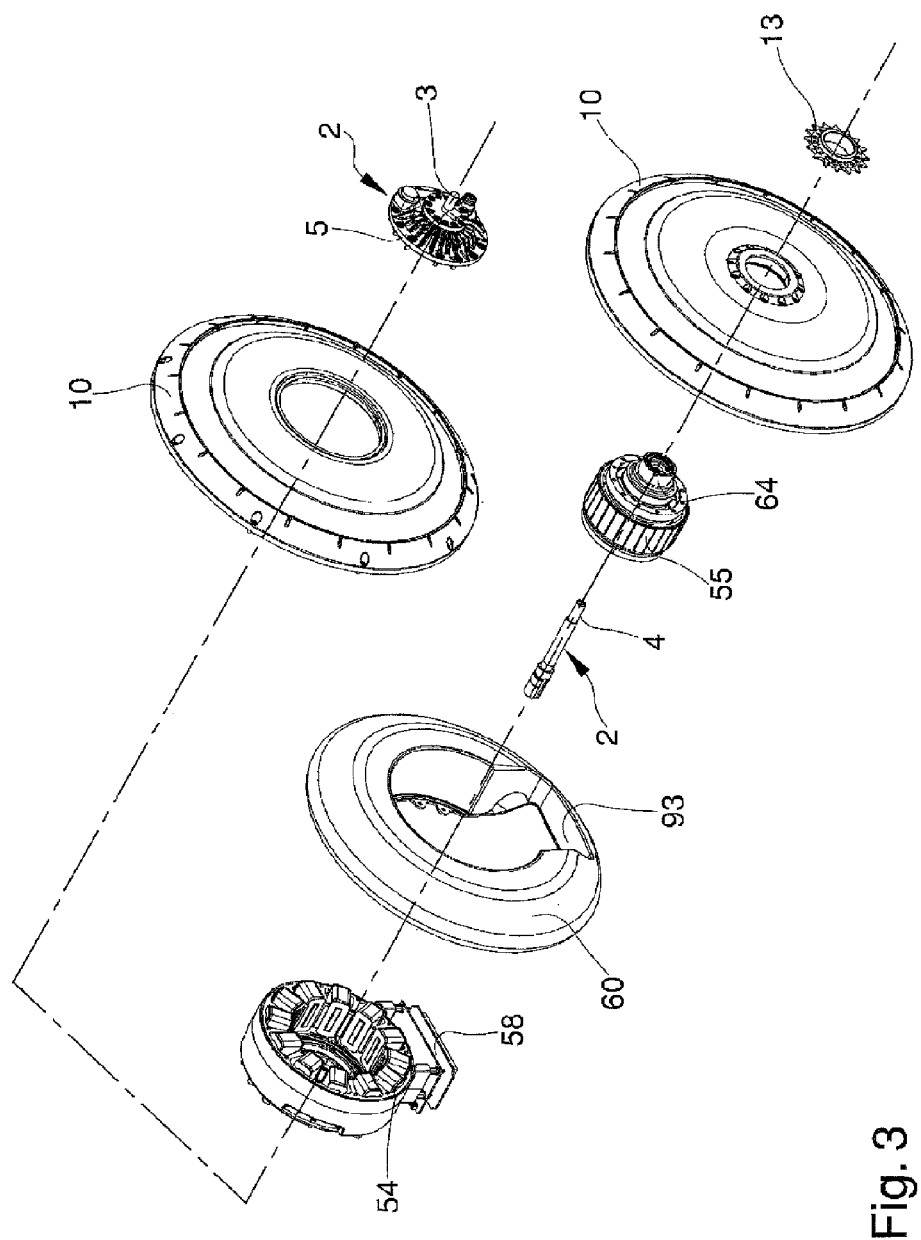
FIG. 3 is an exploded view of the wheel portion of FIG. 2.
Figure 4:
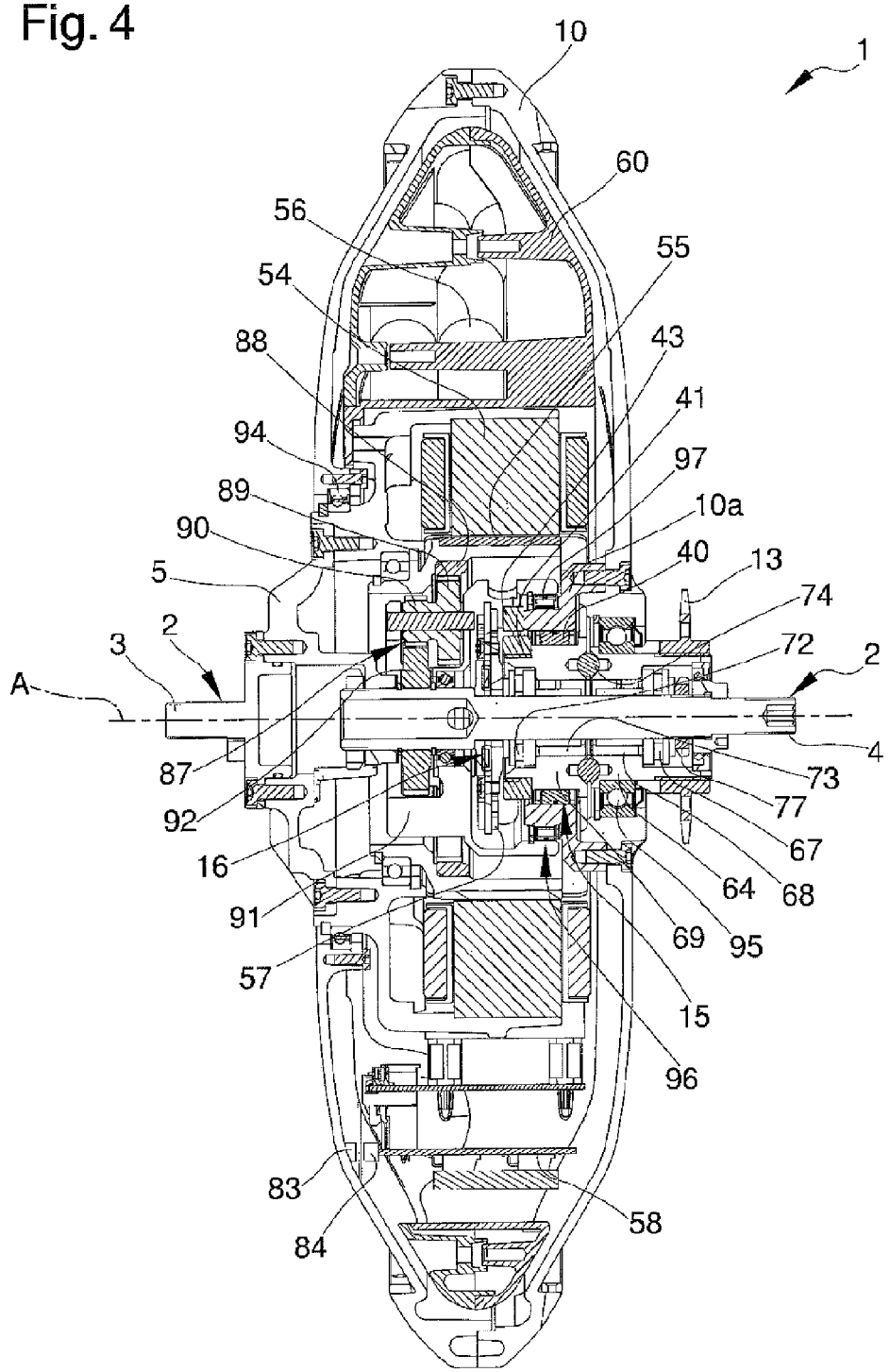
FIG. 4 is an axial cross-section view of the wheel portion of FIG. 2.
Figure 5:
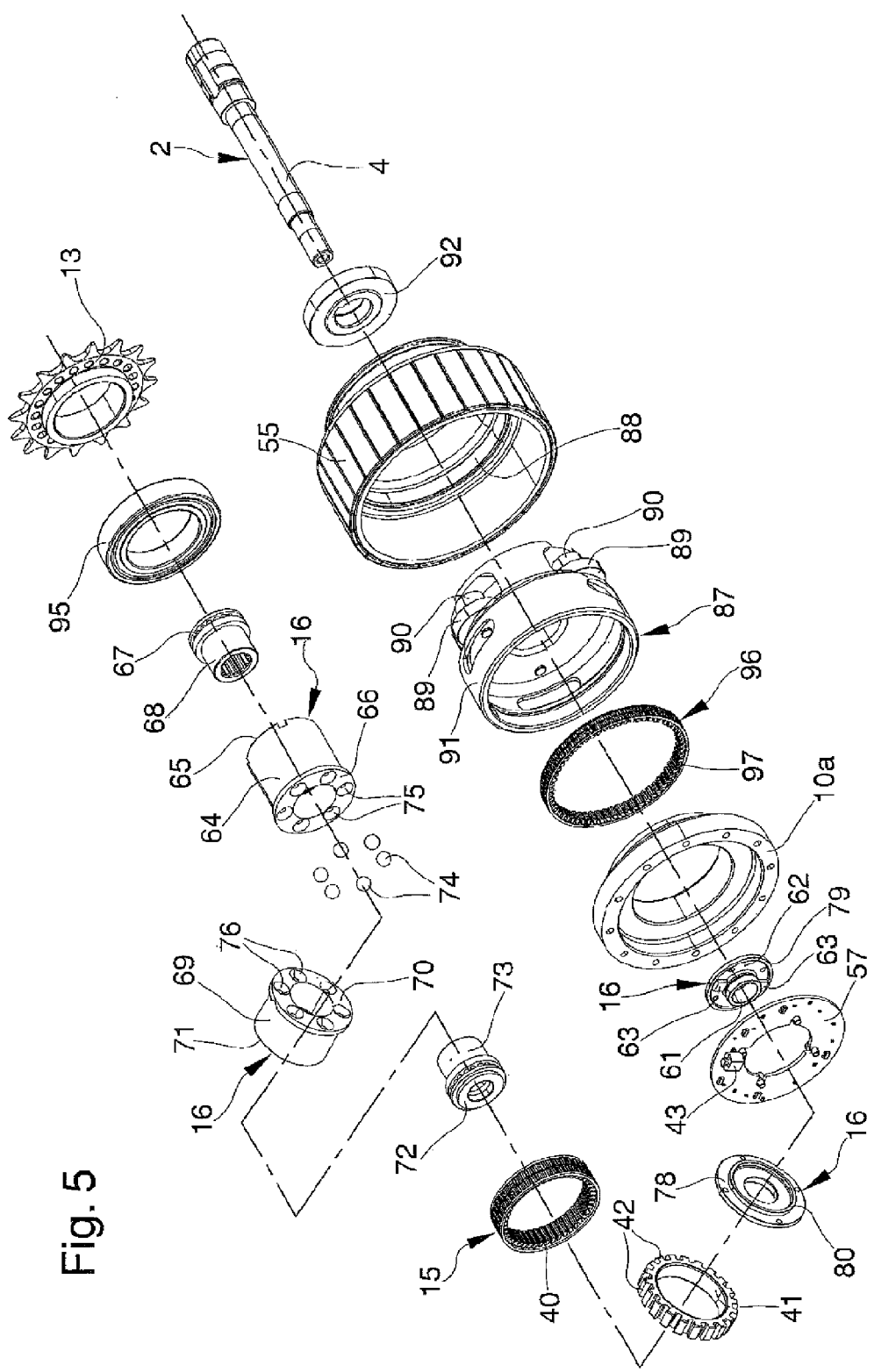
FIG. 5 is an exploded view of a detail of the wheel according to the invention.
Figure 6:
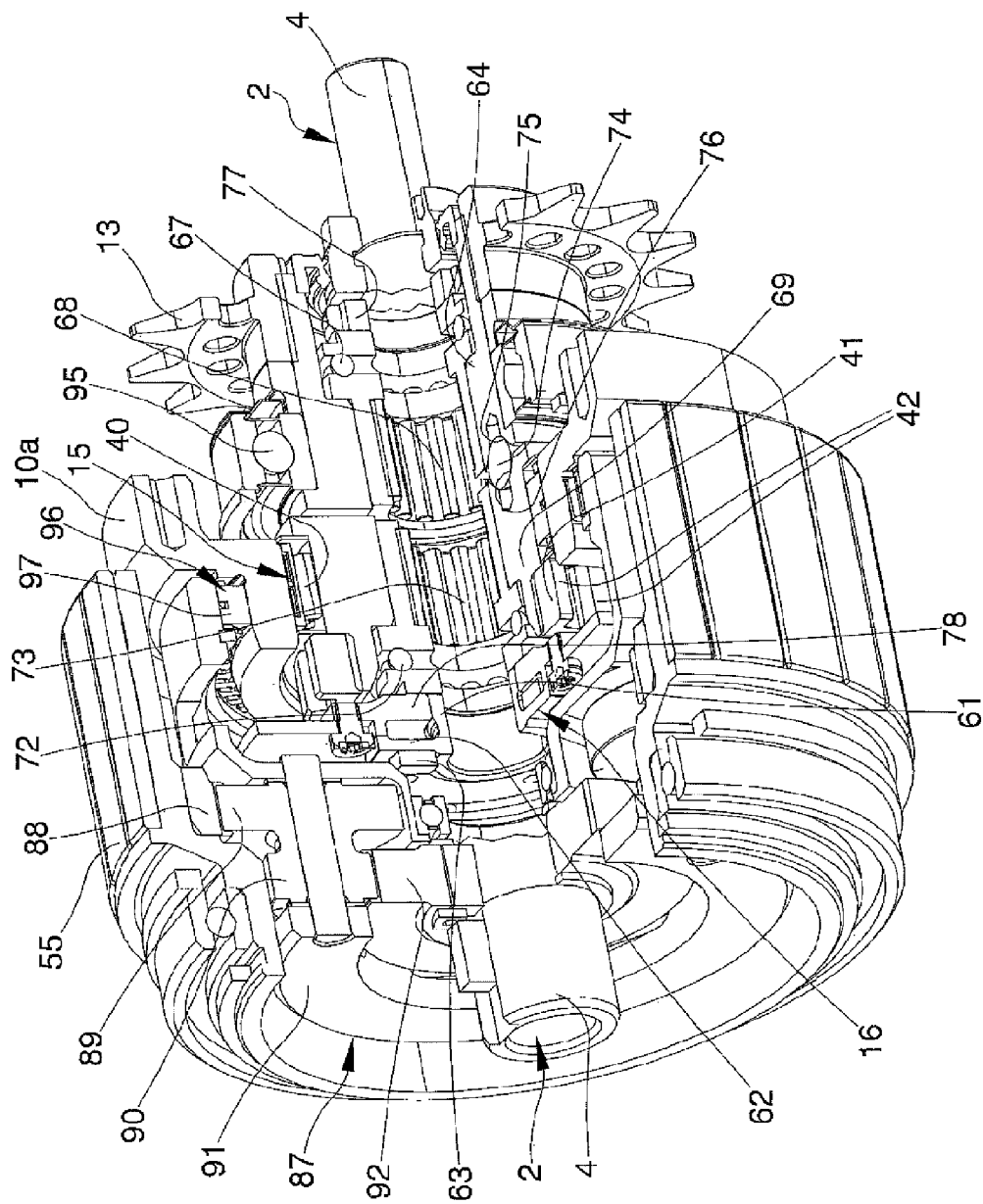
FIG. 6 is a cutaway view of the detail of the wheel of FIG. 5.

In the particular embodiment illustrated in FIG. 1, e.g., the wheel 1 is mounted as a rear wheel of the bike B.

For this purpose, the wheel 1 comprises a fixed structure 2 which is associable with the rear of frame T and which, in particular, has a first axle 3 and a second axle 4 arranged on opposite sides of the wheel 1 and fixable to the frame T in a traditional manner.

The first axle 3 is rigidly associated with a cup element 5 inside which is associated the second axle 4.

On the fixed structure 2 a circle element is mounted in a revolving manner.

The circle element can rotate with respect to the fixed structure 2 around a main rotation axis A coaxial to the axles 3, 4.

The circle element comprises:
a central boxed casing 10, having a substantially discoid shape;
an external circular framework 11, supporting a tire for the on-road circulation of bike B; and
a series of tie-rods 12 for connecting the central boxed casing 10 to the external circular framework 11.

The central boxed casing 10 is defined by a pair of opposing half-shells.

In correspondence of the second axle 4 of the fixed structure 2 is mounted in a revolving manner a propulsion disk 13, e.g. of the type of traditional toothed pinions, which is connectable to the driving pedal crank P by means of a flexible part 9 such as a chain or the like.

With the propulsion disk 13 are associated motion transmission means able to transfer the rotational motion from the propulsion disk 13 to the circle element.

The motion transmission means comprise at least a first detection device 16 able to detect the driving torque transmitted to the circle element from the propulsion disk 13.

The first detection device 16 is usefully integrated in the motion transmission means and constitutes a fundamental part thereof to transmit motion to the circle element.

The first detection device 16 comprises:
at least a measuring element which is subject to a stress condition due to the effect of the driving torque transmitted to the circle element from the propulsion disk 13. In this regard it is noted that in the ambit of the present treatise by the term "stress condition" is meant that, during the transmission of the driving torque, the measuring element undergoes an internal stress and/or dimensional deformation resulting from a torsional-bending and/or compression/traction state;
at least a measuring sensor 63 which is arranged in correspondence of the measuring element and which is able to detect the stress condition of the measuring element and to produce a corresponding electronic signal which can be processed by a processing and control unit, as it will be better described below.

The first detection device 16 also comprises:
at least a first body 64 which can be rotated around the main rotation axis A and operated in rotation by the motion of the propulsion disk 13. The first body 64 consists e.g. of a cylindrical body which is substantially coaxial to the main rotation axis A and which has a first extremity 65 on which is keyed the propulsion disk 13, and a second extremity 66 opposite the first one. The first body 64 is internally hollow and is mounted on a first combined bearing, namely a bearing with the double function of axial bearing 67 and radial bearing 68. The first combined bearing is mounted around the second axle 4 thus allowing the first body 64 and the propulsion disk 13 mounted on it to rotate around the main rotation axis A;
at least a second body 69 which can be rotated around the main rotation axis A and able to drag in rotation the circle element. The second body 69 consists e.g. of a cylindrical body which is substantially coaxial to the main rotation axis A and which has a third extremity 70 facing the second extremity 66 of the first body 64 and a fourth extremity 71 opposite to the third extremity 70. The second body 69 is internally hollow and is mounted on a second combined bearing, namely a bearing with the double function of axial bearing 72 and radial bearing 73. The second combined bearing is mounted around the second axle 4 allowing the second body 69 to rotate around the main rotation axis A;
ramp means placed between the first body 64 and the second body 69 and able to transmit the driving torque from the first body 64 to the second body 69 and to produce an axial thrust on the first body 64 and on the second body 69 along a thrust direction S substantially parallel to the main rotation axis A, the stress condition of the measuring element being produced by the above axial thrust.

The ramp means comprise at least a motion transmission element 74 which is housed in a first housing seat 75 obtained on the first body 64 and in a second housing seat 76 obtained on the second body 69, at least one of the housing seats 75, 76 comprising at least a surface section which is inclined with respect to the main rotation axis A.

Usefully, the motion transmission element 74 is substantially spherical and at least one of the first housing seat 75 and the second housing seat 76 is substantially truncated-conical in shape, with the symmetry axis parallel to the main rotation axis A.

In the embodiment shown in the figures, the ramp means comprise a plurality of motion transmission elements 74, of first housing seats 75 and of second housing seats 76.

The first housing seats 75 are obtained on the second extremity 66 of the first body 64 and are distributed in offset position with respect to the main rotation axis A, e.g. to form a ring.

The second housing seats 76 are obtained on the third extremity 70 of the second body 69 and are distributed in offset position with respect to the main rotation axis A, e.g. to form a ring in a substantially mating manner with the first housing seats 75.

The substantially spherical motion transmission elements 74 are partially housed both in the first housing seats 75 and in the second housing seats 76.

The putting in rotation of the first body 64, therefore, drags in rotation also the second body 69 but the spherical conformation of the motion transmission elements 74 and the truncated-conical conformation of the housing seats 75, 76 determine the formation of an axial component of force that discharges on the first body 64 and on the second body 69.

Such axial component of force applies to the first body 64 and to the second body 69 in opposite directions, moving them away to one another, and originates the above mentioned axial thrust.

More in detail, the axial thrust on the first body 64 is discharged onto the axial bearing 67 of the first combined bearing and on the fixed structure 2 by means of a shoulder 77 that is associated with the second axle 4 and which is in abutment on the axial bearing 67 of the first combined bearing.

The axial thrust on the second body 69, on the other hand, is discharged onto the axial bearing 72 of the second combined bearing and on the measuring element, as it will be better described below.

In the embodiment shown in the figures the measuring element consists of a bending body having at least a first portion 61 associated with the fixed structure 2 and at least a second portion 62 which protrudes overhanging from the first portion 61 and is subject to bending due to the axial thrust acting on the first body 64 and on the second body 69.

The first portion 61 is associated with the fixed structure 2 in proximity of the main rotation axis A and the second portion 62 is disc shaped substantially coaxial to the main rotation axis A and lying on a plane substantially at right angles to the main rotation axis A.

Even more in detail, the first portion 61 is shaped like a sleeve substantially coaxial to the main rotation axis A and mounted around the second axle 4.

From the outer surface of the first sleeve-shaped portion 61 extends the second disc-shaped portion 62.

The first detection device 16 also comprises a distribution body 78 that distributes the axial thrust on an outer circumference 79 of the second disc-shaped portion 62.

The distribution body 78 is disc shaped and is substantially coaxial to the main rotation axis A.

Centrally the distribution body 78 is drilled and mounted around the first sleeve-shaped portion 61.

The distribution body 78 comprises an annular surface 80 in contact with the outer circumference 79 of the second portion 62 and is movable along the thrust direction S due to the axial thrust produced by the first body 64 and by the second body 69.

More in particular, the distribution body 78 has a face in contact with the axial bearing 72 of the second combined bearing and from this it is pushed along the thrust direction S towards the second portion 62, thus deforming it.

The distribution body 78 is substantially rigid or otherwise behaves as a rigid body, at least in comparison to the behavior of the bending body which, on the other hand, is deformed elastically.

The first detection device 16 comprises at least a reference surface 81 able to define an end-of-stroke position for the sliding of the distribution body 78.

The reference surface 81 consists, e.g., in an axial extremity of the first sleeve-shaped portion 61 on which abuts the axial bearing 72 of the second combined bearing.

Under resting condition, i.e. when no driving torque is transmitted, the axial bearing 72 of the second combined bearing is arranged at a predefined distance D from the reference surface 81.

Under work condition, on the other hand, the axial thrust produced by the ramp means determines a micrometric shift in the second body 69 which causes the axial bearing 72 of the second combined bearing to approach the reference surface 81, thus resulting in a corresponding shift in the distribution body 78 and a bending of the second portion 62.

The greater the driving torque transmitted and the greater the axial shift of the axial bearing 72 of the second combined bearing and the bending of the second portion 62.

When reaching a limit value of driving torque, the axial bearing 72 abuts against the reference surface 81 thus preventing further bending of the second portion 62.

The presence of the reference surface 81, therefore, guarantees to contain the bending of the second portion 62 within certain safety limits that ensure the integrity thereof and prevent its possible damage due to oligocyclic fatigue.

The predefined distance D is approximately between 0.05 mm and 0.15 mm.

In the particular embodiment shown in the figures the predefined distance D is equal to 0.1 mm, which corresponds to the transmission of a maximum force on the measuring element equal to 100 kg (981 N).

The measuring sensor 63 that detects the stress condition of the measuring element is chosen from the list comprising: force transducers, load cells, piezoelectric sensors, piezoresistive sensors, magnetostrictive sensors, extensometers.

In the particular embodiment shown in the figures, e.g., the measuring sensor 63 consists of at least an extensometer associated with the second portion 62 to detect its bending.

Usefully the extensometer 63 is an electric resistance extensometer, i.e. an extensometer that consists of a grid of thin metal wire 82 which, when applied to the second portion 62, follows the deformation of the second portion 62 elongating and shortening along with it and causing a variation in the electric resistance of the wire.

The first detection device 16, in particular, comprises a plurality of electric resistance extensometers 63 arranged on at least one of the faces of the second disc-shaped portion 62.

The electric resistance extensometers 63 on the second disc-shaped portion 62 are directed to the circumferential direction.

In other words, the metal wire 82 of the electric resistance extensometers 63 extends mostly in the circumferential rather than in the radial direction (FIG. 9), so as to detect the circumferential deformations F instead of the radial ones.

This particular measure greatly increases the sensitivity of the instrument and the accuracy of the measurement because the measures taken in the circumferential direction are of a higher order of magnitude than those taken in the radial direction.

Even more in detail, it is underlined that the first detection device 16 comprises four electric resistance extensometers 63 which are electrically connected to one another to form a Wheatstone bridge.

The electric resistance extensometers 63 are distributed on the second portion 62 around the main rotation axis A and staggered by 90° to one another.

Two electric resistance extensometers 63 are arranged on a face of the second disc-shaped portion 62 while the other two electric resistance extensometers 63 are arranged on the opposite face.

For the processing of the electronic signal of the measuring sensors 63 the processing and control unit comprises a first electronic board 57 which is electronically connected to the measuring sensors 63 and is mounted on the distribution body 78.

The first electronic board 57 has an annular configuration and is mounted around the distribution body 78.

In proximity of the first electronic board 57 is provided a second detection device able to detect the speed of rotation of the second body 69.

The second detection device, in particular, comprises a first phonic wheel 41 mounted on the second body 69, which for this purpose has a series of protrusions 42 the transit of which during rotation is detected by a first pick-up sensor 43, of the optical, magnetic type or the like, mounted on the first electronic board 57.

The speed of the circle element 10, 11, 12 does not always coincide with the speed of rotation of the second body 69; for this reason, the wheel 1 is provided with a third detection device able to detect the speed of rotation of the circle element.

The third detection device, in particular, comprises a second phonic wheel 83 mounted on the circle element and having protrusions the transit of which during rotation is detected by a second pick-up sensor 84 similar to the first.

For the transmission of the driving torque from the propulsion disk 13 to the circle element the motion transmission means comprise at least a first freewheel mechanism 15 placed between the second body 69 and the circle element.

The first freewheel mechanism 15 allows to drag in rotation the circle element as long as the user applies to the driving pedal crank P a rotation equal to or greater than that of the circle element.

More in detail, the first freewheel mechanism 15 is placed between the second body 69 and an annular extension 10a of the central boxed casing 10, which protrudes inside of the wheel 1 and is arranged around the second body 69.

The outer surface of the second body 69 and the inner surface of the annular extension 10a are spaced apart to accommodate a series of first gripping teeth 40 that define the first freewheel mechanism 15.

The first gripping teeth 40 are shaped in such a way that, if the second body 69 rotates in one direction, then the first gripping teeth 40 move to grip and are made integral with the second body 69 with the annular extension 10a while, if rotation is in the opposite direction, the first gripping teeth 40 are free to slide with respect to the second body 69 and/or to the annular extension 10a without any motion transmission.

The wheel 1 is usefully also equipped with an electric motor, which is associated with the fixed structure 2 and is able to cooperate with the motion coming from the driving pedal crank P and from the propulsion disk 13 to motorize the circle element.

The electric motor comprises a statoric element 54 associated with the fixed structure 2 since it is mounted on the cup element 5, and a rotoric element 55 revolving with respect to the statoric element 54 and associated with the circle element by interposition of a reduction gear unit 87.

The electric motor is e.g. of the Torque type with permanent magnets or reluctance type or the like, with the statoric element 54 and the rotoric element 55 that are substantially ring shaped and are arranged one inside the other substantially around the motion transmission means.

This particular measure allows to reduce the overall dimensions in a practical and functional way.

The reduction gear unit 87 reduces the transmission ratio between the electric motor and the circle element, allowing the electric motor to rotate at significantly higher speeds than those of the circle element.

The reduction gear unit 87 comprises:
- an inner gearing annulus gear 88 associated with the rotoric element 55;
- at least a planet gear which engages the annulus gear 88. Usefully a plurality of planet gears is provided;
- a planet carrier body 91 which supports the planet gears for the transmission of motion to the circle;
- a sun gear 92 which engages the planet gears and which is locked on the fixed structure 2.

Usefully, each planet gear is double and comprises a first toothing 89 which engages the annulus gear 88 and a second toothing 90, integral and coaxial to the first one, which engages the sun gear 92, the diameter of the pitch circumference of the first toothing 89 being greater than the diameter of the pitch circumference of the second toothing 90.

The rotoric element 55 defines a first tube-shaped body arranged within the statoric element 54.

Similarly, the planet carrier body 91 defines a second tube-shaped body that is housed within the first tube-shaped body 55 and houses in turn the motion transmission means, or at least part of them.

For the transmission of torque from the electric motor to the circle element a second freewheel mechanism 96 is provided placed between the reduction gear unit 87 and the circle element.

The second freewheel mechanism 96 allows to drag in rotation the circle element as long as the electric motor applies to the planet carrier body 91 a rotation equal to or greater than that of the circle element.

More in detail, the second freewheel mechanism 96 is placed between the planet carrier body 91 and the annular extension 10a of the central boxed casing 10, which protrudes inside of the second tube-shaped body 91.

The inner surface of the second tube-shaped body 91 and the outer surface of the annular extension 10a are spaced apart to accommodate a series of second gripping teeth 97 that define the second freewheel mechanism 96.

The second gripping teeth 97 are shaped so that, if the planet carrier body 91 rotates in one direction, then the second gripping teeth 97 move to grip and are made integral with the planet carrier body 91 with the annular extension 10a while, if rotation is in the opposite direction, the second gripping teeth 97 are free to slide with respect to the planet carrier body 91 and/or to the annular extension 10a without any motion transmission.

In this way, when the bike B runs e.g. a descent and/or the user stops pedaling, the rolling motion of the circle element on the ground is not transferred to the pedals by virtue of the first freewheel mechanism 15 and not even to the reduction gear unit 87 and to the electric motor by virtue of the second freewheel mechanism 96.

For the power supply of the electric motor, the wheel 1 is equipped with an electric feeder mounted on the fixed structure 2.

The electric feeder is composed, e.g., of one or more battery packs 56 operatively connected to the statoric element 54 of the electric motor and contained within a collection container 60.

The collection container 60 is substantially ring shaped and is arranged around the electric motor, thereby helping to reduce the overall dimensions in a practical and functional manner.

For the control and management of the operation of the electric motor, the processing and control unit comprises a second electronic board 58 which is operatively connected to the first electronic board 57 and to the electric motor.

The processing and control unit, therefore, meant as the set of the first electronic board 57 and second electronic board 58, is operatively connected both to the first detection device 16 and to the electric motor and is able to control the activation of the electric motor according to the driving torque detected by the first detection device 16 and, eventually, by other programmable operating parameters.

More in detail, the second processing and control unit is associated with the outer surface of the statoric element 54 and is housed in a recess 93 obtained on the inner side of the collection container 60.

The processing and control unit is associated with a wireless data transmission device of the radio wave, Bluetooth type or the like, able to interface the processing and control unit with an external electronic device 59 equipped with viewing display and usable by a user.

The external electronic device 59 consists, e.g., of an on-board dedicated computer or of a software which can be installed on the mobile phone of the user; in both cases, the external electronic device 59 is mounted in a practical and cost-effective manner on the handlebars M of the bike B and is used to display the operational data of the processing and control unit (bike speed, pedaling speed, pedaling force, etc.) and to set the operating parameters.

Conveniently, the central boxed casing 10 of the circle element is able to contain the main mechanical and electronic components of the wheel 1, in particular the motion transmission means, the electric motor, the electric feeder and the processing and control unit.

The central boxed casing 10 is mounted on a first rotoidal bearing 94 associated with the fixed structure 2 and on a second rotoidal bearing 95 mounted around the first body 64.

The operation of the present invention is the following.

During normal use of the bike B, the thrust produced by the user on the driving pedal crank P is transferred to the propulsion disk 13 which drags in rotation the first body 64.

Thanks to the motion transmission elements 74, the second body 69 is also dragged in rotation from which, via the first freewheel mechanism 15, the rotation is transferred to the circle element as long as the user applies to the driving pedal crank P a rotation equal to or greater than that of the circle element.

In this point, by means of the first pick-up sensor 43, the pedaling speed originated by the user is detected.

Thanks to the motion transmission elements 74, furthermore, on the second body 69 is also transferred an axial force component that pushes the axial bearing 72 of the second combined bearing towards the reference surface 81 and the distribution body 78 against the measuring element.

Due to the effect of the axial thrust, the measuring element bends according to the driving torque actually transmitted.

The amount of bending is detected by the extensometers 63, which provide an electronic signal than can be processed by the processing and control unit to command or not the start of the electric motor to a mapping of predetermined parameters.

In the event that the electric motor is activated, between the statoric element 54 and the rotoric element 55 a torque is produced concordant to the direction of forward movement of the bike B which assists the pedaling of the user in putting in rotation the wheel 1.

It has been found, in practice, how the described invention achieves the intended objects.

In this regard it is underlined that the particular trick of providing a measuring element subject to a stress condition due to the driving torque and a measuring sensor which detects such stress condition allows to measure the driving torque without the user feeling annoying behavior of the wheel, thus improving the movement reactivity and driving comfort during pedaling.

The invention claimed is:

1. A wheel (1) for pedal-assisted bikes, comprising:
   at least a fixed structure (2) having attachment means for the attachment to the frame (T) of a bike (B) with a driving pedal crank (P);
   at least a circle element mounted on said fixed structure (2) in a revolving way around a main rotation axis (A);
   at least a propulsion disk (13) mounted on said fixed structure (2) in a revolving way and drivable in rotation by said driving pedal crank (P);
   motion transmission means for the transmission of the rotational motion from said propulsion disk (13) to said circle element, which comprise at least a first detection device (16) suitable for detecting the driving torque transmitted to said circle element from said propulsion disk (13);
   at least an electric motor associated with said fixed structure (2) and suitable for cooperating with said propulsion disk (13) to motorize said circle element; and
   at least a processing and control unit operatively connected to said first detection device (16) and to said electric motor and suitable for controlling the activation of said electric motor according to the driving torque detected by said first detection device (16);
   wherein said first detection device (16) comprises:
      at least a measuring element which is subject to a stress condition due to the effect of the driving torque transmitted to said circle element by said propulsion disk (13);
      at least a measuring sensor (63) which is arranged in correspondence to said measuring element and which is suitable for detecting said stress condition of the measuring element and for producing a corresponding electronic signal which can be processed by said processing and control unit;
      a first body (64) revolving around said main rotation axis (A) and operated in rotation by the motion of said propulsion disk (13);
      a second body (69) revolving around said main rotation axis (A) and suitable for driving in rotation said circle element;

ramp means placed between said first body (64) and said second body (69) for transmitting said driving torque from said first body (64) to said second body (69) and for producing an axial thrust on said first body (64) and said second body (69) along a thrust direction (S) substantially parallel to said main rotation axis (A), said stress condition of said measuring element being produced by said axial thrust.

2. The wheel (1) according to claim 1, wherein said ramp means comprise at least a motion transmission element (74) which is housed in a first housing seat (75) obtained on said first body (64) and in a second housing seat (76) obtained on said second body (69), at least one of said housing seats (75, 76) comprising at least a surface section which is inclined with respect to said main rotation axis (A).

3. The wheel (1) according to claim 2, wherein said motion transmission element (74) is substantially spherical.

4. The wheel (1) according to claim 2, wherein at least one of said first housing seat (75) and said second housing seat (76) is substantially truncated-conical in shape.

5. The wheel (1) according to claim 1, wherein said measuring element comprises at least a bending body having at least a first portion (61) associated with said fixed structure (2) and at least a second portion (62) which protrudes overhanging from said first portion (61) and is subject to bending due to the effect of said axial thrust.

6. The wheel (1) according to claim 5, wherein:
said first portion (61) is associated with said fixed structure (2) in the proximity of said main rotation axis (A); and
said second portion (62) is disc-shaped substantially coaxial to said main rotation axis (A) and lying on a plane substantially at right angles to said main rotation axis (A).

7. The wheel (1) according to claim 6, wherein:
said first portion (61) is shaped like a sleeve substantially coaxial to said main rotation axis (A), and
said second disc-shaped portion (62) extends from the outer surface of said first portion (61).

8. The wheel (1) according to claim 6, wherein said first detection device (16) comprises at least a distribution body (78) for distributing said axial thrust on an outer circumference (79) of said second disc-shaped portion (62), said distribution body (78) comprising an annular surface in contact with said outer circumference (79) and being mobile along said thrust direction (S) due to the effect of said axial thrust.

9. The wheel (1) according to claim 8, wherein said first detection device (16) comprises at least a reference surface (81) suitable for defining an end-of-stroke position for the sliding of said distribution body (78).

10. The wheel (1) according to claim 8, wherein said processing and control unit comprises a first electronic board (57) which is electronically connected to said measuring sensor (63) and is mounted on said distribution body (78).

11. The wheel (1) according to claim 6, wherein said measuring sensor (63) comprises an extensometer associated with said second portion (62).

12. The wheel (1) according to claim 11, wherein said extensometer (63) is an electric resistance extensometer.

13. The wheel (1) according to claim 12, wherein said first detection device (16) comprises a plurality of said electric resistance extensometers (63) arranged on at least one of the faces of said second disc-shaped portion (62).

14. The wheel (1) according to claim 13, wherein said electric resistance extensometers (63) on said second disc-shaped portion (62) are directed in a circumferential way.

15. The wheel (1) according to claim 1, wherein said circle element comprises at least a central boxed casing (10) containing said motion transmission means, said electric motor, said processing and control unit and at least an electric feeder associated said fixed structure (2) and suitable for electrically supplying said electric motor.

16. The wheel (1) according to claim 1, wherein said electric motor comprises a statoric element (54) associated with said fixed structure (2) and a rotoric element (55) associated with said circle element by interposition of a reduction gear unit (87), said statoric element (54) and said rotoric element (55) being substantially ring-shaped and arranged substantially around said motion transmission means.

17. The wheel (1) according to claim 16, wherein said reduction gear unit (87) comprises:
an inner gearing annulus gear (88) associated with said rotoric element (55);
at least a planet gear, engaging with said annulus gear (88);
a planet carrier body (91) which supports said planet gear for the transmission of motion to said circle element;
a sun gear (92) engaging with said planet gear and locked on said fixed structure (2).

18. The wheel (1) according to claim 1, wherein said motion transmission means comprise at least a first freewheel mechanism (15) placed between said second body (69) and said circle element.

19. The wheel (1) according to claim 16, wherein said wheel (1) comprises at least a second freewheel mechanism (96) placed between said reduction gear unit (87) and said circle element.

* * * * *